(12) United States Patent
Nieminen

(10) Patent No.: US 12,553,654 B2
(45) Date of Patent: Feb. 17, 2026

(54) SHEET OF INSULATING PLATES AND ITS USE

(71) Applicant: FF-FUTURE OY, Salo (FI)

(72) Inventor: Henri Nieminen, Salo (FI)

(73) Assignee: FF-FUTURE OY, Salo (FI)

( * ) Notice: Subject to any disclaimer, the term of this patent is extended or adjusted under 35 U.S.C. 154(b) by 211 days.

(21) Appl. No.: 18/039,664

(22) PCT Filed: Dec. 7, 2021

(86) PCT No.: PCT/FI2021/050849
§ 371 (c)(1),
(2) Date: May 31, 2023

(87) PCT Pub. No.: WO2022/123116
PCT Pub. Date: Jun. 16, 2022

(65) Prior Publication Data
US 2024/0027121 A1    Jan. 25, 2024

(30) Foreign Application Priority Data
Dec. 8, 2020 (FI) ..................................... 20206263

(51) Int. Cl.
*F25C 5/18* (2018.01)
*A63C 19/12* (2006.01)
(Continued)

(52) U.S. Cl.
CPC ................ *F25C 5/18* (2013.01); *A63C 19/12* (2013.01); *B32B 3/16* (2013.01); *B32B 3/266* (2013.01);
(Continued)

(58) Field of Classification Search
CPC ... F25C 5/18; A63C 19/12; B32B 3/16; B32B 3/266; B32B 5/02; B32B 27/08;
(Continued)

(56) References Cited

U.S. PATENT DOCUMENTS 5,506,020 A    4/1996 Haberkorn
6,122,925 A *  9/2000 Rawlins ................. A63C 19/12
                                                    62/235

(Continued)

FOREIGN PATENT DOCUMENTS

EP    2216473 A1    8/2010
FI    128770 B  * 11/2020 ................ F25C 5/18

(Continued)

OTHER PUBLICATIONS

EP 0201987 A1 Translation (Year: 1986).*

(Continued)

*Primary Examiner* — Jerry-Daryl Fletcher
*Assistant Examiner* — Dario Antonio Deleon
(74) *Attorney, Agent, or Firm* — Meunier Carlin & Curfman LLC

(57) ABSTRACT

Sheet of insulating plates comprising successively placed lamellae of insulating plates attached to each other at their edge side which is cross directional in relation to the longitudinal direction of the sheet of insulating plates, alternately at the upper corners and lower corners of the cross directional edge sides, whereby thus formed uniform sheet of insulating plates comprising several lamellae of insulating plates can be folded into accordion-like folded stack of lamellae of insulating plates and unfolded again into a uniform sheet of insulating plates, which sheet of insulating plates has an upper surface and a lower surface. The upper surface of the sheet of insulating plates comprises a surface layer which is arranged in the longitudinal direction of the sheet of insulating plates alternately attached to and detached from the lamellae of the insulating plates in groups of two successive lamellae of insulating plates.

21 Claims, 3 Drawing Sheets

Figure 1:
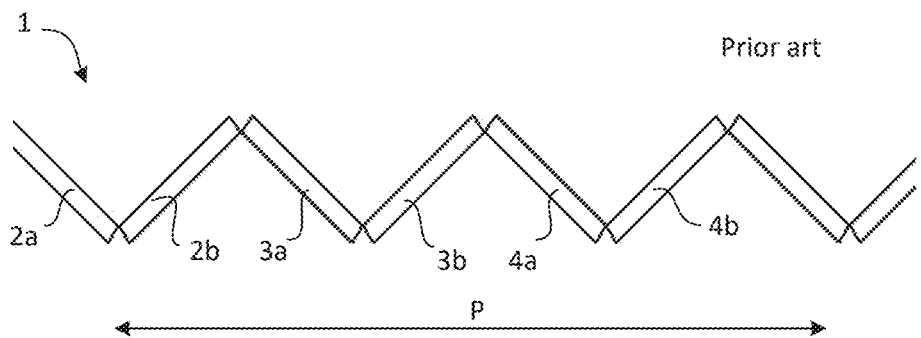

(51) Int. Cl.
  *B32B 3/16* (2006.01)
  *B32B 3/26* (2006.01)
  *B32B 5/02* (2006.01)
  *B32B 27/08* (2006.01)
  *B32B 27/12* (2006.01)
  *B32B 27/30* (2006.01)
  *B32B 27/32* (2006.01)
  *F16L 59/02* (2006.01)

(52) U.S. Cl.
  CPC ............... *B32B 5/02* (2013.01); *B32B 27/08* (2013.01); *B32B 27/12* (2013.01); *B32B 27/302* (2013.01); *B32B 27/304* (2013.01); *B32B 27/32* (2013.01); *F16L 59/026* (2013.01); *B32B 2307/304* (2013.01); *B32B 2307/7265* (2013.01); *B32B 2607/00* (2013.01)

(58) Field of Classification Search
  CPC ..... B32B 27/12; B32B 27/302; B32B 27/304; B32B 27/32; B32B 2307/304; B32B 2307/7265; B32B 2607/00; F16L 59/026; F16L 59/10; E01H 4/00
  See application file for complete search history.

(56) References Cited

U.S. PATENT DOCUMENTS

| | | | |
|---|---|---|---|
| 11,241,610 B2 * | 2/2022 | Martikainen | .......... A63C 19/10 |
| 2016/0144804 A1 * | 5/2016 | Sugiura | ................... B32B 27/12 |
| | | | 296/183.1 |
| 2018/0111466 A1 | 4/2018 | Ching | |
| 2022/0055337 A1 * | 2/2022 | Bergeron et al. | ..... B32B 27/304 |
| 2022/0139365 A1 * | 5/2022 | Forrest | ................... B32B 27/32 |
| | | | 181/290 |

FOREIGN PATENT DOCUMENTS

| | | | | |
|---|---|---|---|---|
| GB | 0201987 A1 * | 11/1986 | ............. | A63C 19/12 |
| JP | S59191984 U | 10/1984 | | |
| JP | S59191983 U | 12/1984 | | |
| JP | 2000024167 A | 1/2000 | | |
| JP | 2003207241 A | 7/2003 | | |
| JP | 2007051451 A | 3/2007 | | |
| JP | 2011137363 A | 7/2011 | | |
| KR | 20200109421 A | 9/2020 | | |
| WO | WO 0107126 A1 * | 2/2001 | ............. | A01G 13/30 |

OTHER PUBLICATIONS

WO 0107126 A1 Translation (Year: 2001).*
FI 128770 B Translation (Year: 2020).*
International Search Report and Written Opinion in Application No. PCT/FI2021/050849, mailed May 11, 2022, 9 pages.
Search Report in Finnish Application No. 20206263, dated May 19, 2021, 1 page.
Office Action and English translation issued by the Japanese Patent Office in corresponding application No. 2023-557830 on Nov. 4, 2025.

* cited by examiner

SHEET OF INSULATING PLATES AND ITS USE

CROSS-REFERENCES

This is a U.S. national stage filing of international patent application number PCT/FI2021/050849 filed on Dec. 7, 2021 and claiming priority to Finnish national application number 20206263 filed on Dec. 8, 2020.

FIELD OF THE INVENTION

The invention relates to a sheet of insulating plates according to the appended independent claim. The invention relates also to use of a sheet of insulating plates as a protective covering, especially a sheet of insulating plates for use as a protective covering for storing snow.

BACKGROUND OF THE INVENTION

Nowadays, it is more common to store snow over summer in heat insulated snow storages for maintaining snow on slalom slopes or cross-country ski tracks. Storing snow over summer requires covering storable snow by enough heat insulating materials suitable for the purpose so that melting of snow can be prevented as efficiently as possible.

One fast and easy way to realise installation and removal of the heat insulations for snow storage is to arrange heat insulation materials into an accordion-like folded sheet of insulating plates. In this kind of sheet of insulating plates, the heat insulation materials, such as insulating plates or groups of insulating plates, are typically arranged into pouches or into sleeves with two opposite open ends formed of waterproof material, whereby the insulation plates or groups of insulation plates adapted inside the pouches or sleeves attach to each other in an articulated manner by means of the joints between the pouches or sleeves and form an accordion-like folded structure. When the sheet of insulating plates is unfolded, the insulating plates or groups of insulating plates attached to each other by means of pouches or sleeves settle tightly against each other. Successive joints in the sheet of insulating plates are located alternately on the plane of the upper surface and the lower surface of the insulating plates. By means of these formed joints the sheet of insulating plates can be folded into accordion-like folded stack of insulating sheets, and respectively, the sheet of insulating plates can be easily unfolded into a sheet of insulating plates and pulled over a snow pile.

Gathering of water into the joints between the insulating plates in the folds opening towards the upper surface of the sheet of insulating plates is a challenge in the accordion-like sheets of insulating plates. Water that has gathered into these joint regions may flow to the snow pile and thus cause unwanted melting of snow. Sheets of insulating plates can be case-specifically placed over the storable snow, but sheets of insulating plates are usually placed so that the structure is limiting rainwater as much as possible from getting under the sheet of insulating plates. Separate joint protection coverings placed over the fold regions of the sheets of insulating plates can be used for preventing rainwater from flowing under the sheet of insulating plates. Thus, rainwater cannot get so easily under the sheet of insulating plates, and to a snow pile, for example. This kind of separate joint protection coverings are difficult to install, and however, rainwater may get under the sheet of insulating plates from some joint regions.

OBJECT AND DESCRIPTION OF THE INVENTION

An object of the present invention is to reduce or even eliminate the above-mentioned problems appearing in prior art.

An object of the present invention is to provide an accordion-like folded sheet of insulating plates having a structure that reduces or prevents rainwater from getting and gathering to the fold regions between the lamellae of insulating plates in the sheet of insulating plates, and thus also prevents rainwater from getting under the sheet of insulating plates.

An object of the invention is especially to provide an accordion-like folded sheet of insulating plates which is easy to install and does not need using of separate joint protection coverings for protecting joint regions of the sheet of insulating plates to prevent rainwater from getting into them.

In order to attain this object, the sheet of insulating plates according to the invention is primarily characterised in what is presented in the characterising part of the independent claim.

Sheet of insulating plates according to the invention comprises successively placed lamellae of insulating plates attached to each other at their edge side which is cross directional in relation to the longitudinal direction of the sheet of insulating plates, alternately at the upper corners and lower corners of the cross directional edge sides, whereby thus formed uniform sheet of insulating plates comprising several lamellae of insulating plates can be folded into an accordion-like folded stack of lamellae of insulating plates and unfolded again into a uniform sheet of insulating plates, which sheet of insulating plates has an upper surface and a lower surface. The upper surface of the sheet of insulating plates according to the invention comprises a surface layer which is arranged in the longitudinal direction of the sheet of insulating plates alternately attached to and detached from the lamellae of the insulating plates in groups of two successive lamellae of insulating plates.

The sheet of insulating plates according to the invention can be used as a protective covering. According to one embodiment of the invention, the sheet of insulating plates according to the invention is used as a protective covering for arranging heat insulation for snow storage in storing snow. Especially in storing snow, sheets of insulating plates according to the invention can be easily arranged over and/or on sides of a snow pile adjacently and/or successively, and after snow storing stage the sheets of insulating plates according to the invention can be folded into a stack due to the accordion-like structure of the sheet of insulating plates, whereby they are easy to store. The sheet of insulating plates according to the invention can be used as a protective covering also in other applications. Especially, it is inexpensive to use the sheet of insulating plates at sites where protective covering having heat insulation properties is needed. Accordion-like folded structure of the sheet of insulating plates according to the invention enables easy usage of the sheet of insulating plates.

In the method according to the invention for covering the object to be protected, the object is covered at least partly by the sheets of insulating plates according to the invention. In the method according to the invention for arranging heat insulation for snow storage in storing snow, the snow pile formed at the snow storage location is covered with heat insulation materials, of which at least some are insulating plates, and sheets of insulating plates according to the invention are used for heat insulating the snow pile.

The accordion-like folded sheet of insulating plates according to the invention is based on it that a surface layer is arranged in the longitudinal direction of the sheet of insulating plates on the upper surface of the sheet of insulating plates, which surface layer is typically arranged substantially over the entire length and width of the sheet of insulating plates. The surface layer arranged on the upper surface of the sheet of insulating plates is arranged in the longitudinal direction of the sheet of insulating plates alternately attached to and detached from the lamellae of the insulating plates. In the sheet of insulating plates according to the invention, the surface layer arranged on its upper surface is arranged in the longitudinal direction of the sheet of insulating plates alternately attached to and detached from the lamellae of the insulating plates in groups of two successive lamellae of insulating plates. This way, the surface layer attached to the lamellae of insulating plates receives the load when moving the sheet of insulating plates, and the surface layer forms a uniform surface layer on the upper surface of the sheet of insulating plates when the sheet of insulating plates is unfolded into a uniform sheet, whereby rainwater cannot enter the seam regions between the lamellae of insulating plates. However, the surface layer does not prevent functioning of the accordion-like structure of the sheet of insulating plates, and the sheet of insulating plates can be folded into accordion-like stack of lamellae of insulating sheets and unfolded again into a uniform sheet of insulating plates.

The sheet of insulating plates according to the invention facilitates usage of the sheet of insulating plates as a protective covering since no separate joint protection coverings or other protective coverings are needed to be used with the sheet of insulating plates according to the invention to prevent rainwater from getting into the joint regions between the lamellae of insulating plates. The sheet of insulating plates according to the invention provides an easy and cost-effective protective covering to be used especially as a protective covering in storing snow and in other objects requiring heat insulation.

SHORT DESCRIPTION OF THE DRAWINGS

Figure 2:
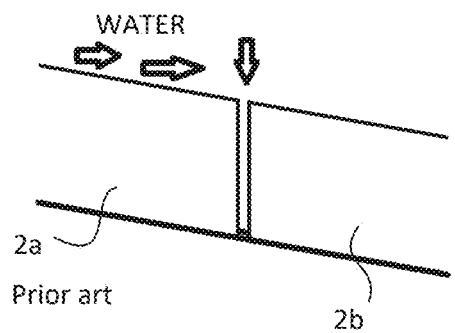
Figure 3:
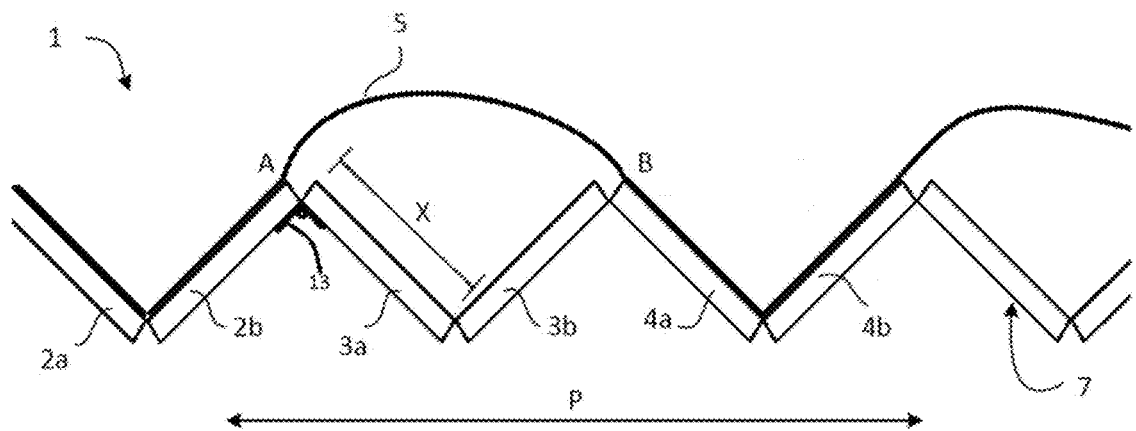
Figure 4:
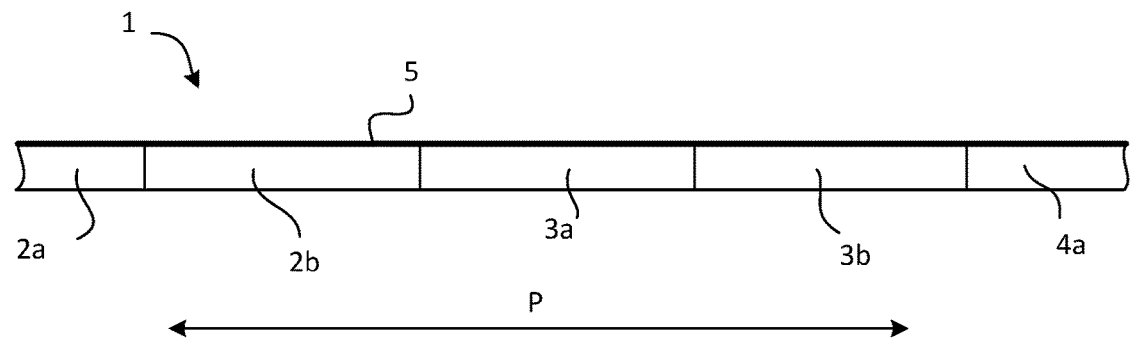
Figure 5:
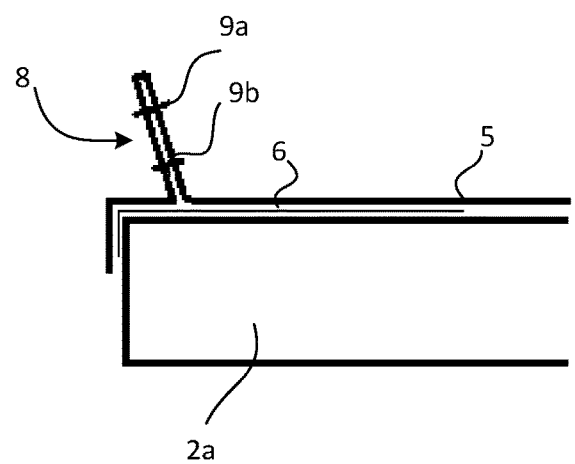
Figure 6:
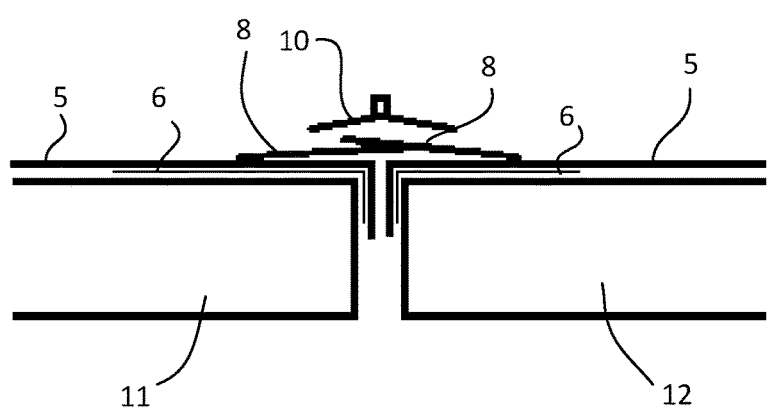
Figure 7:
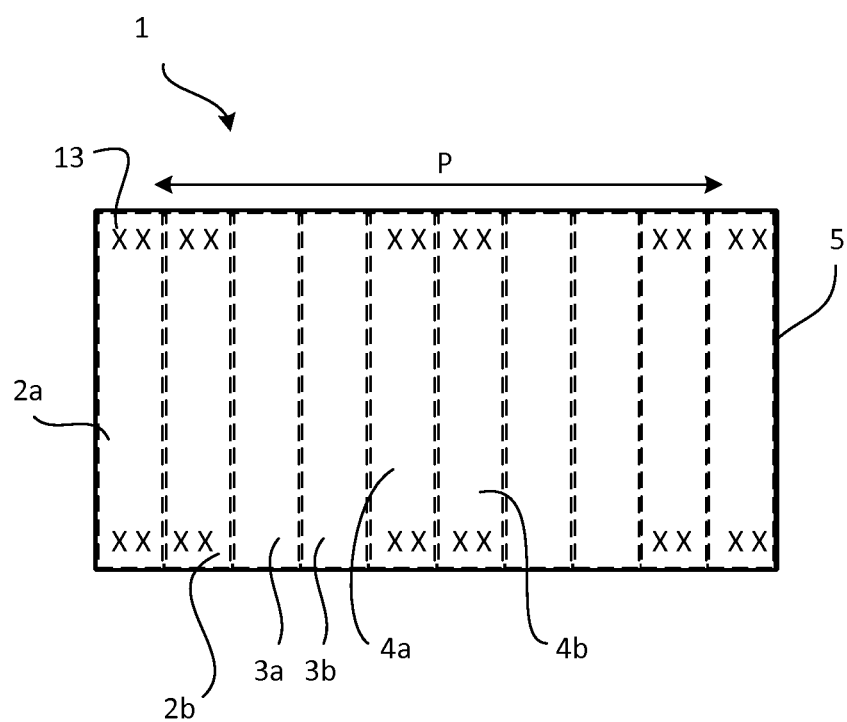

In the following, the invention will be described in more detail with reference to the appended drawings, in which FIG. 1 shows a sheet of insulating plates according to the prior art in a cross-section in the longitudinal direction of the sheet of insulating plates, FIG. 2 shows a joint region opening to the direction of an upper surface between the lamellae of the insulating plates in a sheet of insulating plates according to the prior art, FIG. 3 shows a sheet of insulating plates according to an embodiment of the invention in a cross-section in the longitudinal direction of the sheet of insulating plates, wherein the surface layer is arranged in the longitudinal direction of the sheet of insulating plates alternately attached to and detached from the lamellae of the insulating plates in groups of two successive lamellae of insulating plates, FIG. 4 shows a sheet of insulating plates according to an embodiment of the invention unfolded into a uniform sheet of insulating plates as shown in a cross-sectional view in the longitudinal direction of the sheet of insulating plates, FIG. 5 shows an edge structure of the lamellae of insulating plates in the sheet of insulating plates according to an embodiment of the invention, in which structure a surface layer comprises a fold and through holes and/or attachments arranged into the fold, FIG. 6 shows a structure of a joint region between two adjacent sheets of insulating plates according to an embodiment of the invention, and FIG. 7 shows a sheet of insulating plates according to an embodiment of the invention as shown from above, in which sheet the surface layer is attached to the lamellae of the insulating plates at the edges of the surface layer in groups of two lamellae of the insulating plates in the longitudinal direction of the sheet of insulating plates.

DETAILED DESCRIPTION OF THE INVENTION

A sheet of insulating plates according to the invention comprises successively placed lamellae of insulating plates which are attached to each other at their edge side which is cross directional in relation to the longitudinal direction of the sheet of insulating plates, alternately at the upper corners and lower corners of the cross directional edge sides, thus forming an accordion-like folded sheet of insulating plates. Longitudinal direction of the sheet of insulating plates is a direction in which lamellae of insulating plates are placed successively in an articulated manner to obtain an accordion-like folded sheet structure. Number of the lamellae of insulating plates in the sheet of insulating plates may vary. The sheet of insulating plates has an upper surface and a lower surface, which surfaces are formed of lamellae of insulating plates when the sheet of insulating plates is unfolded into a uniform sheet of insulating plates.

The upper surface of the sheet of insulating plates according to the invention further comprises a surface layer. Typically, the surface layer is arranged substantially over the entire length and width of the sheet of insulating plates. The surface layer is arranged only onto one surface of the sheet of insulating plates according to the invention. In the sheet of insulating plates according to the invention, the surface layer is arranged in the longitudinal direction of the sheet of insulating plates alternately attached to and detached from the lamellae of the insulating plates in groups of two successive lamellae of insulating plates. In an embodiment of the invention, the surface layer is attached substantially onto the entire upper surface of the lamella of insulating plates in a single lamella of insulating plates. In another embodiment, the surface layer is attached onto the lamellae of insulating plates only at the edge sides of the lamellae of insulating plates in the longitudinal direction of the sheet of insulating plates. In an embodiment of the invention, the surface layer is attached to the lamellae of insulating plates in a detachable manner. When the surface layer is detached from the successive lamellae of insulating plates, the length of the detached surface layer is defined to correspond to the length of the lamellae of insulating plates along the distance in question in the longitudinal direction of the sheet of insulating plates, whereby a separate area of the surface layer arranges tightly onto the surface of these lamellae of insulating plates when unfolding the sheet of insulating plates into a uniform sheet. This surface layer arrangement enables functioning of the accordion-like folded structure of the sheet of insulating plates, and at the same time, protects upwards opening joint regions.

In an embodiment of the invention, the surface layer is arranged in the longitudinal direction of the sheet of insulating plates alternately attached to and detached from the surface of the lamellae of insulating plates in groups of two successive lamellae of insulating plates, whereby the surface layer forms a joint region of an upper corner of the edge sides which are cross directional in relation to the longitudinal direction of every second lamellae of insulating plates in the sheet of insulating plates, and the surface layer is detached from the surface of lamellae of insulating sheets at every second joint region of the upper corner. This way, also the surface layer can be arranged as uniform along the entire distance of the upper surface of the sheet of insulating plates, and when the sheet of insulating plates is arranged as a uniform sheet, the surface layer forms a uniform surface layer arranging tightly onto the surface of the sheet of insulating plates, whereby rainwater chutes are prevented from being formed into the upwards opening joint regions. In a typical embodiment, the first two and the last two lamellae of insulating plates in the longitudinal direction of the sheet of insulating plates comprise a surface layer attached onto the lamellae of insulating plates.

In an embodiment according to the invention, the lamella of insulating plates in the sheet of insulating plates comprises one insulating plate, preferably all lamellae of the sheet of insulating plates are formed of one insulating plate. In another embodiment according to the invention, the lamella of insulating plates in the sheet of insulating plates comprises two or more insulating plates arranged against each other. Lamella of insulating plates according to the invention may comprise for example groups of insulating plates formed of two or more insulating plates arranged adjacently and/or successively. When the lamella of insulating plates comprises two or more insulating plates, the insulating plates are typically attached to each other and/or the insulating plates are arranged inside separate pouches or sleeves/pouches or the like with open ends. In an embodiment, the accordion-like folded structure of the sheet of insulating plates is formed by means of pouches/sleeves and the surface layer according to the invention is arranged on the upper surface of the pouches/sleeves according to the invention.

In a typical embodiment, an insulating plate forming the lamella of insulating plates according to the invention is a rectangular insulating plate comprising short edge sides and, in relation to them, substantially perpendicular long edge sides.

In a typical embodiment of the invention, the lamellae of insulating plates are arranged in the longitudinal direction of the sheet of insulating plates so that the long edge sides of the lamellae of insulating plates are cross directional in relation to the longitudinal direction of the sheet of insulating plates.

Most typically, the insulating plates of the lamellae of insulating plates are for example insulating plates made of polyurethane or polystyrene. The lamella of insulating plates in the sheet of insulating plates according to an embodiment of the invention comprises an insulating plate, which comprises extruded polystyrene (XPS), expanded polystyrene (EPS), polyurethane (PIR/PUR) and/or polyphenol. According to an embodiment of the invention, the insulating plates in the lamellae of insulating plates may comprise also biomaterial based material such as for example polylactide (PLA) foam or the like. Thus, the lamella of insulating plates in the sheet of insulating plates according to an embodiment of the invention comprises an insulating plate or insulating plates comprising extruded polystyrene (XPS), expanded polystyrene (EPS), polyurethane (PIR/PUR), polyphenol and/or PLA foam. According to an advantageous embodiment of the invention, the lamella of insulating plates comprises an insulating plate which is made of extruded polystyrene (XPS). XPS material has high strength, and it does not absorb water which makes it durable and especially useful material for sheet of insulating plates. Furthermore, XPS has good thermal insulation properties, which secure good storage life of snow, especially in purposes for storing snow. Alternatively, the insulating plates or part of them can also be some other insulating plates suitable for the purpose. Outer dimensions of the insulating plates in the lamellae of insulating plates can be chosen case-specifically, or standard sized insulating plates can be used. For sufficient considering of climatic conditions at the snow pile location, insulating plates need to be thick enough.

A surface layer according to an embodiment of the invention is waterproof. Typically, the surface layer is formed of waterproof material. The surface layer according to an embodiment of the invention comprises fabric-like material and/or plastic. In an advantageous embodiment according to the invention, the surface layer is formed of material which comprises polyvinylchloride (PVC) or polyethylene (PE). The surface layer can comprise one or more material layers. In an embodiment of the invention, the surface layer comprises two or more material layers, whereby at least one layer comprises reinforcing material, such as fibre reinforcement. In the sheet of insulating plates according to the invention, the surface layer is arranged only on one side of the sheet of insulating plates, whereby material having higher quality properties can be used as material for the surface layer, for example material with good UV radiation resistance.

In an embodiment of the invention, the surface layer is attached onto the surface of the lamella of insulating plates. In an embodiment according to the invention, the surface layer is attached directly onto the surface of the lamella of insulating plates. In an embodiment, a separate reinforcing material attached to the surface layer as well as to the lamella of insulating plates is arranged between the surface layer and the lamella of insulating plates. The reinforcing material is arranged at least partly between the surface cover and the lamella of insulating plates, typically at least on the edge areas of the lamellae of insulating plates. The reinforcing material can be for example fibre reinforcement material, such as some fabric-like material, for example. Purpose of the reinforcing material is to reinforce the structure and, when needed, to ensure attachment of the surface layer to the surface of the lamella of insulating plates. Especially on the edge areas of the lamellae of insulating plates where the most forces are directed to when moving the sheet of insulating plates, the reinforcing material reinforces the structure of the sheet of insulating plates according to the invention. The reinforcing material can be for example glued onto the surface of the lamella of insulating plates and glued and/or sewed onto the surface layer. The surface layer and the possible reinforcing material can be attached to the lamella of insulating sheets also by other manners suitable for the purpose. In an embodiment of the invention, the surface layer or the surface layer and the reinforcing layer are attached to the lamellae of insulating plates in a detachable manner.

In an embodiment of the invention, the lower surface of the lamellae of insulating plates in the sheet of insulating plates can be coated. Purpose of the coating is to protect the insulating plate material and thus make the lamellae in the sheet of insulating plates more durable.

In a typical sheet of insulating plates according to the invention, at least the joint regions of the edge sides which are cross directional in relation to the longitudinal direction of the sheet of insulating plates and between the lamellae of insulating plates, and which the joint regions not comprising a joint forming the surface layer, comprise a hinge structure (e.g., hinge structure 13, schematically illustrated in FIG. 3).

In an embodiment according to the invention, all the joint regions of the edge sides which are cross directional in relation to the longitudinal direction of the sheet of insulating plates and between the lamellae of insulating plates, comprise a hinge structure. The hinge structure can comprise for example elastic mass and/or reinforcement material such as fibre reinforcement, or the hinge structure is formed in another manner suitable for the purpose. All the joint regions comprising a separate hinge structure, it is not necessary for the surface layer to be attached onto the surface of the lamellae of insulating plates. Stress and load directed to the sheet of insulating plates are received by the surface layer arranged on the upper surface of the sheet of insulating plates, whereby considerably less stress is directed to other joint regions between the lamellae of insulating plates in the sheet of insulating plates, whereby they can be formed in a simpler manner. For forming a joint, only suitable mass, glue and/or tape, for example, can be used in the joint region, but durability can be increased by using also reinforcement material, fibre reinforcement or the like in the joint region. In an embodiment of the invention, the joint regions of the lamellae of insulating plates are form in a detachable manner by means of attaching means. The joints between the lamellae of insulating plates are typically arranged along the entire distance of the lamellae of insulating plates in the longitudinal direction of the joint region.

In an embodiment of the invention, the articulated attachment of the lamellae of insulating plates can be implemented so that at least part of the successive lamellae of insulating plates is arranged into the pouches or into sleeves with two opposite open ends formed of waterproof fabric-like material, whereby successive pouches or sleeves of the lamellae of insulating plates are connected to each other at one of their edges by means of a suitable manner of joint. Thus, the lamellae of insulating plates arranged into the pouches or sleeves attach to each other at their opposite edges in an articulated manner by means of the joints between the pouches and sleeves, and, furthermore, a separate surface layer is arranged onto the upper surface of the sheet of insulating plates, which surface layer is arranged, in accordance with the invention, in turns attached to and detached from the lamellae of insulating plates in the longitudinal direction of the sheet of insulating plates. In an embodiment according to the invention, the surface layer is attached onto the pouches and sleeves of lamellae of insulating plates only at the edge sides of the lamellae of insulating plates in the longitudinal direction of the sheet of insulating plates. In another embodiment according to the invention, the surface layer is attached onto the surface of the pouches/sleeves of the lamellae of insulating plates, preferably onto the entire surface area. When the sheet of insulating plates according to the invention comprises a separate surface layer, the pouches and sleeves of the lamellae of insulating plates can be made of less expensive material and only the surface layer can be made of more durable material, for example of UV radiation resistant material.

In the sheet of insulating plates according to an embodiment of the invention, the lamellae of insulating plates are arranged in the sheet of insulating plates in a detachable manner, so that they can be easily changed, in case the lamella of insulating plates is damaged. When the lamellae of insulating plates are attached to the structure of the sheet of insulating plates in a detachable manner, the structure of the sheet of insulating plates can be also easily disassembled when needed.

In a sheet of insulating plates according to an embodiment of the invention, a fold has been formed to the surface layer at the cross directional end edges in relation to the longitudinal direction of the sheet of insulating plates and/or at the side edges of the lamellae of insulating plates in the longitudinal direction of the lamellae of insulating plates in the sheet of insulating plates. A fold means that the surface layer is arranged at least double bent for some distance, whereby a fold separated from the surface of the lamellae of insulating plates can be formed at the side edge of the lamellae of insulating plates and/or at the end edges in the longitudinal direction of the sheet of insulating plates. In an embodiment according to the invention, through holes are arranged into the fold on the surface layer to enable attachment of attaching means to the fold on the surface layer and, thus, tying adjacent and/or successive sheets of insulating plates to each other. In an embodiment according to the invention, the fold comprises one or several annular through holes, such as eyelet holes or the like, for example. In an embodiment according to the invention, the through holes, such as eyelet holes, may have been arranged at the edge of the surface layer extending outside the lamella of insulating plates. This edge can be formed of a single layer of the surface layer, or the edge of the surface layer is at least double bent. In an embodiment of the invention, separate attaching means can be attached to these through holes, such as ropes, zipper or the like which enables an easy and fast attachment of adjacent and/or successive sheets of insulating plates to each other and as tightly as possible one against the other, without large space left between adjacent and/or successive sheets of insulating plates. According to one embodiment of the invention, also other attaching means enabling attachment of the adjacently and/or successively arranged sheets of insulating plates to each other can be arranged at the edge/edges of the surface layer and/or to the folds formed on the surface layer. Attachment can be realized by tying or, for example, by a zipper which is arranged at the edge/edges of the surface layer and/or to the folds formed on the surface layer. This way, the sheets of insulating plates according to the invention can be formed to large surfaces for a protective covering, and there is no need to arrange separate protective coverings for the joint regions between separate sheets of insulating plates to ensure sufficient tightness.

Typically, the sheet of insulating plates according to the invention further comprises a pulling member for pulling the sheet of insulating plates to its use location and away from the use location. The pulling member can be for example a pulling rope, wire, sling or the like.

Typically, the sheet of insulating plates according to the invention is used as a protective covering. Especially, the sheet of insulating plates according to the invention is a protective covering to be used for arranging heat insulation for snow storage in storing snow.

Method for arranging heat insulation for snow storage comprises covering the snow pile formed at the snow storage location with heat insulation materials. In the method according to the invention, sheets of insulating plates according to the invention, which can be arranged adjacently and/or successively on the snow pile, are used for heat insulation of the snow pile. At least part of the heat insulations used for covering snow pile are formed of sheets of insulating plates according to the invention which are attached to each other in an accordion-like manner and adjacently and/or successively pulled over or on sides of a snow pile when insulating the snow storage, and after snow storing stage when the storaged snow is taken into use, are folded back into the accordion-like folded form to be stored in and taken into use again. The surface layer of the sheets of insulating plates according to the invention forms a uniform covering on the upper surface of the sheet of insulating plates when the sheet of insulating plates is unfolded into an elongated sheet of insulating plates, thereby efficiently preventing water from getting into the snow pile. Sheets of insulating plates are arranged adjacently and/or successively over the snow pile, whereby adjacent or successive sheets of insulating plates are attached to each other by means of throughs and/or attachments arranged at the edge of the sheets of insulating plates. Respectively, sheets of insulating plates can be used to protect also other objects.

DETAILED DESCRIPTION OF THE DRAWINGS

FIG. 1 shows a sheet of insulating plates 1 according to prior art in a cross-sectional view in the longitudinal direction of the sheet of insulating plates. The sheet of insulating plates 1 comprises successively placed lamellae of insulating plates 2a, 2b, 3a, 3b, 4a, 4b attached to each other at their edge side which is cross directional in relation to the longitudinal direction P of the sheet of insulating plates, alternately at the upper corners and lower corners of the cross directional edge sides, whereby thus formed uniform sheet of insulating plates comprising several lamellae of insulating plates can be folded into accordion-like folded stack of lamellae of insulating plates and unfolded into a uniform sheet of insulating plates, which sheet of insulating plates has an upper surface and a lower surface. Typically, in a prior art sheet of insulating plates, the lamellae of insulating plates are arranged inside the pouches, whereby the successively arranged lamellae of insulating plates are attached to each other in an articulated manner by attaching the pouches of the lamellae of insulating plates to each other alternately at their opposite edges by means of a suitable joint for forming an accordion-like folded structure of the sheet of insulating plates. Typically, the lamellae of insulating plates are in the pouches, whereby in each lamella of insulating plates the material protecting the insulating material is around the lamellae of insulating plates.

FIG. 2 shows a challenge in a prior art sheet of insulating plates in the joint region between two successive lamellae of insulating plates 2a, 2b, wherein the joint region opens towards the upper surface of the sheet of insulating plates. As illustrated by arrow in FIG. 2, the joint region may form a so-called chute into the sheet of insulating plates, where water has access from the surface of the sheet of insulating plates. In this case, water may run through this chute in the joint region to a snow pile covered by the sheet of insulating plates, and thus, causing unwanted melting of snow under the sheet of insulating plates.

FIG. 3 shows a sheet of insulating plates 1 according to an embodiment of the invention in a cross-sectional view in the longitudinal direction of the sheet of insulating plates. Sheet of insulating plates 1 according to the invention comprises successively placed lamellae of insulating plates 2a, 2b, 3a, 3b, 4a, 4b attached to each other at their edge side which is cross directional in relation to the longitudinal direction P of the sheet of insulating plates, alternately at the upper corners and lower corners of the cross directional edge sides, whereby thus formed uniform sheet of insulating plates comprising several lamellae of insulating plates can be folded into an accordion-like folded stack of lamellae of insulating plates and unfolded into a uniform sheet of insulating plates, which sheet of insulating plates has an upper surface and a lower surface. The upper surface of the sheet of insulating plates 1 according to the invention comprises a surface layer 5. The sheet of insulating plates 1 has an upper surface and a lower surface, the lower surface being against the covered object when the sheet of insulating plates is unfolded into a uniform sheet, and the upper surface forming the surface of the sheet of insulating plates facing outwards. The surface layer 5 is in the longitudinal direction P of the sheet of insulating plates alternately attached to and detached from the lamellae of the insulating plates. In FIG. 3, the surface layer 5 is attached to the lamellae of insulating plates in two successive lamellae of insulating plates and the surface layer 5 forms a joint region of the upper corner of the edge sides being cross directional in relation to the longitudinal direction P of the sheet of insulating plates between these successive lamellae of insulating plates, such as the joint region of the lamella of insulating sheets 2a and 2b, and 4a and 4b, in FIG. 3. In FIG. 3, the surface layer 5 is attached to the lamellae of insulating plates 2a, 2b and detached from the lamellae of insulating plates 3a, 3b in the longitudinal direction of the sheet of insulating plates, and again, attached to the next lamellae of insulating plates 4a, 4b. Attachment of the surface layer 5 in the longitudinal direction of the sheet of insulating plates 1 according to an advantageous embodiment of the invention continues respectively in the same manner in groups of two successive lamellae of insulating plates over the entire length of the sheet of insulating plates. As illustrated in FIG. 3, the surface layer 5 is detached from two successive lamellae of insulating plates between points A and B. Width of one single lamella of insulating plates in the longitudinal direction of the sheet of insulating plates is X, and thus, length of the detached surface layer in the longitudinal direction of the sheet of insulating plates between the points A and B is 2X. The lower surface 7 of the lamellae of insulating plates in the sheet of insulating plates can be coated by a coating suitable for the purpose.

In the sheet of insulating plates according to an embodiment of the invention shown by FIG. 3, at least the joints between the lamellae of insulating sheets 2 b and 3 a, the lamellae of insulating sheets 3 a and 3 b and the lamellae of insulating sheets 3 b and 4 a are formed in a manner suitable for the purpose by arranging for example separate elastic mass and/or fibre reinforcement between the upper or lower edges of the edge sides of the lamellae of insulating plates for forming a hinge structure 13. Joint region under the surface layer 5 can also have a separate joint, which is formed in a manner suitable for the purpose.

FIG. 4 illustrates a sheet of insulating plates according to an embodiment of the invention unfolded into a uniform sheet of insulating plates, whereby the surface layer 5 forms a tight uniform surface on the upper surface of the lamellae of insulating plates over the longitudinal direction P of the entire sheet of insulating plates.

FIG. 5 shows a fold 8 according to an embodiment of the invention at the edge of the lamella of insulating plates 2a. The fold 8 has been formed on the surface layer 5 at the cross directional end edges in relation to the longitudinal direction of the sheet of insulating plates and/or at the side edges of the lamellae of insulating plates in the longitudinal direction P of the sheet of insulating plates. The fold 8 has been formed by arranging the surface layer 5 at least double bent for some distance. Typically, the fold 8 comprises one or more through holes 9a, 9b, such as eyelet holes or other attaching means.

FIG. 5 also shows that a separate reinforcement material 6 arranged between the surface cover 5 and the lamella of insulating plates 2a, and which is attached onto both the surface layer 5 and the lamella of insulating plates 2a. The reinforcement material is arranged between the surface layer 5 and the lamella of insulating plates 2a at least at the edge areas of the lamella of insulating plates 2a. This way, the surface layer can be tightly attached to the lamella of insulating plates and the structure is made durable.

FIG. 6 shows as a schematic view a structure where two sheets of insulating plates 11, 12 according to the invention are placed adjacently and their ends are placed tightly against each other, and the sheets of insulating plates 11, 12 are tightly tied to each other by means of the folds 8 and the attaching means 10 connected to them at the end of the sheets of insulating plates. In the embodiment shown in FIG. 6, the folds 8 partly overlap when the sheets of insulating plates 11, 12 are placed against each other. A separate attaching means 10, such as a zipper structure, which enables attachment of sheets of insulating plates to each other easily and tightly, can be attached to these folds.

FIG. 7 shows a sheet of insulating plates according to an embodiment of the invention illustrated from above, in which sheet of insulating plates 1 the surface layer 5 is attached at the edges of the surface layer onto the lamellae of insulating plates in groups of two lamellae of insulating plates in the longitudinal direction P over the entire length of the sheet of insulating plates. In the figure, the surface layer is attached to the edges of the lamellae of insulating plates in the lamellae of insulating plates 2a, 2b, 4a, 4b, continuing this way in groups of two lamellae of insulating plates over the entire length of the sheet of insulating plates. In this embodiment, the lamellae of insulating plates 2a, 2b, 3a, 3b, 4a, 4b can be arranged inside separate pouches/sleeves and formed into an accordion-like folded sheet of insulating plates. The surface layer 5 is arranged on the upper surface of the sheet of insulating plates and attached to the edges of the lamellae of insulating plates by means of attachment means 13 in groups of two lamellae of insulating plates.

The invention claimed is:

1. A sheet of insulating plates comprising successively placed several lamellae of insulating plates attached to each other at their edge side which is cross directional in relation to a longitudinal direction of the sheet of insulating plates, alternately at upper corners and lower corners of the cross directional edge sides, whereby thus formed uniform sheet of insulating plates comprising the several lamellae of insulating plates is capable of being foldable into an accordion-like folded stack of the several lamellae of insulating plates and unfoldable into the uniform sheet of insulating plates, which sheet of insulating plates has an upper surface and a lower surface, wherein the upper surface of the sheet of insulating plates comprises a surface layer which is arranged in the longitudinal direction of the sheet of insulating plates alternately attached to and detached from the several lamellae of the insulating plates in groups of two successive lamellae of insulating plates, wherein the insulating plates are formed of a heat insulating material.

2. The sheet of insulating plates according to claim 1, wherein the lamellae of insulating plates are arranged in the longitudinal direction of the sheet of insulating plates so that long edge sides of the lamellae of insulating plates are cross directional in relation to the longitudinal direction of the sheet of insulating plates.

3. The sheet of insulating plates according to claim 1, wherein the lamella of insulating plates comprises one insulating plate.

4. The sheet of insulating plates according to claim 3, wherein the heat insulating material of the insulating plate comprises extruded polystyrene (XPS), expanded polystyrene (EPS), polyurethane (PIR/PUR), polyphenol, or polylactide (PLA) foam.

5. The sheet of insulating plates according to claim 3, wherein all lamellae in the sheet of insulating plates are formed of one insulating plate.

6. The sheet of insulating plates according to claim 1 wherein the lamella of insulating plates in the sheet of insulating plates comprises two or more insulating plates arranged against each other.

7. The sheet of insulating plates according to claim 1, wherein the surface layer is formed of waterproof material.

8. The sheet of insulating plates according to claim 1, wherein
the surface layer comprises fabric-like material or plastic material.

9. The sheet of insulating plates according to claim 8, wherein the surface layer is formed of material comprising polyvinyl chloride (PVC) or polyethylene (PE).

10. The sheet of insulating plates according to claim 1, wherein the surface layer is attached onto the surface of the lamella of insulating plates.

11. The sheet of insulating plates according to claim 10, wherein the surface layer attached onto the surface of the lamellae of insulating plates in two successive lamellae of insulating plates forms a joint region of upper corner of the edge sides between these successive lamellae of insulating plates being cross directional in relation to the longitudinal direction of the sheet of insulating plates.

12. The sheet of insulating plates according to claim 1, wherein a separate reinforcing material is arranged between the surface layer and the lamella of insulating plates, which separate reinforcing material has been attached to the surface layer and lamella of insulating plates.

13. The sheet of insulating plates according to claim 1, wherein t the lower surface of the lamellae of insulating plates in the sheet of insulating plates is coated.

14. The sheet of insulating plates according to claim 1, wherein at least the joint regions of the edge sides between the lamellae of insulating plates and cross directional in relation to the longitudinal direction of the sheet of insulating plates, which joint regions not comprising the joint forming the surface layer, comprise a hinge structure.

15. The sheet of insulating plates according to claim 1, wherein a fold is formed to the surface layer at the cross directional end edges in relation to the longitudinal direction of the sheet of insulating plates.

16. The sheet of insulating plates according to claim 15, wherein the fold comprises one or more through holes, such as eyelet holes.

17. A method to cover objects requiring heat insulation, the method comprising providing a sheet of insulating plates according to claim 1 as a protective covering.

18. The method of claim 17, wherein the object requiring heat insulation is snow and the insulating plates are provided for snow storage.

19. The sheet of insulating plates according to claim 1, wherein the edge of the surface layer extends outside the lamella of insulating plates.

20. The sheet of insulating plates according to claim 19, wherein the edge of the surface layer extending outside the lamella of the insulating plates comprises one or more through holes, such as eyelet holes.

21. The sheet of insulating plates according to claim 1, wherein:
the sheet of insulating plates includes a first group of two successive lamellae, a second group of two successive lamellae, and a third group of two successive lamellae, the second group of two successive lamellae are positioned between the first and third group of two successive lamellae, the surface layer is attached to the first and third group of successive lamellae, and the surface layer is detached from second group of two successive lamellae.

\* \* \* \* \*